US011834147B2

(12) United States Patent
Balasubramanian et al.

(10) Patent No.: US 11,834,147 B2
(45) Date of Patent: Dec. 5, 2023

(54) PROGRAMMABLE PATTERN-BASED SWEEP MECHANISM FOR AIRCRAFT WINDSCREEN WIPER SYSTEM

(71) Applicant: Rosemount Aerospace Inc., Burnsville, MN (US)

(72) Inventors: Rameshkumar Balasubramanian, Karnataka (IN); Cal Roeske, Eagan, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 481 days.

(21) Appl. No.: 17/010,419

(22) Filed: Sep. 2, 2020

(65) Prior Publication Data

US 2021/0179252 A1  Jun. 17, 2021

(30) Foreign Application Priority Data

Dec. 11, 2019  (IN) .............................. 201911051318

(51) Int. Cl.
*B64C 1/14* (2006.01)
*B64D 43/00* (2006.01)

(52) U.S. Cl.
CPC ................ *B64C 1/14* (2013.01); *B64D 43/00* (2013.01)

(58) Field of Classification Search
CPC ................................... B64C 1/14; B64D 43/00
See application file for complete search history.

(56) References Cited

U.S. PATENT DOCUMENTS

| | | | |
|---|---|---|---|
| 9,829,995 B1* | 11/2017 | Reed | G06F 3/0488 |
| 9,834,177 B2 | 12/2017 | Hogler et al. | |
| 10,196,043 B2 | 2/2019 | Shoda et al. | |
| 2006/0000044 A1* | 1/2006 | de La Pena Razquin | B60S 1/42 15/250.4 |
| 2009/0282636 A1* | 11/2009 | Braun | B60S 1/08 318/444 |
| 2017/0113655 A1* | 4/2017 | Shoda | B60S 1/0833 |
| 2019/0061696 A1* | 2/2019 | Vadgaonkar | B60S 1/0807 |
| 2020/0189762 A1* | 6/2020 | Mothe | B64D 45/00 |
| 2020/0384956 A1* | 12/2020 | Balasubramanian | B64F 5/30 |

FOREIGN PATENT DOCUMENTS

DE          4417385 A     11/1995

* cited by examiner

*Primary Examiner* — John E Breene
*Assistant Examiner* — Jeremy A Delozier
(74) *Attorney, Agent, or Firm* — CANTOR COLBURN LLP (57) ABSTRACT

A windscreen wiper system (WWS) architecture is provided. The WWS architecture includes a wiper assembly and an electronic control unit (ECU) configured to control operations of the wiper assembly. The ECU is configured to recognize that a command to engage a predefined wiper mode is received. The predefined wiper mode is characterized in that a windscreen is divided into sectors and the wiper assembly is controllably operated to sweep across one or more of the sectors in a predefined pattern with a predefined sweep speed. The ECU is further configured to control the wiper assembly to operate in the predefined wiper mode according to the command being received.

16 Claims, 11 Drawing Sheets

PROGRAMMABLE PATTERN-BASED SWEEP MECHANISM FOR AIRCRAFT WINDSCREEN WIPER SYSTEM

CROSS-REFERENCE TO RELATED APPLICATIONS

This application claims the benefit of Indian Application No. 201911051318 filed Dec. 11, 2019, the disclosure of which is incorporated herein by reference in its entirety.

BACKGROUND

The following description relates to windscreen wiper systems (WWSs) and, more specifically, to a programmable pattern-based sweep mechanism for a WWS of an aircraft.

A WWS of an aircraft can be installed on both pilot and co-pilot sides of a windscreen. Generally, a WWS of an aircraft is operated during taxiing, takeoff, climb, approach and landing phases of flights. The prime objective of the WWS is to keep the windscreen clean from the accumulation of water, ice, dust or other debris. To this end, a WWS typically includes wiper arms, wiper blades supported on the wiper arms to be biased toward the windscreen and a driving and control system that either parks the wiper arms and wiper blades in parked positions or causes the wiper arms to move the wiper blades back and forth across the windscreen in a wiping or cleaning motion.

In greater detail, a WWS of an aircraft is normally a mechanical system that offers fixed modes of wiper operation and fixed speeds of operation to meet the objective. The wiper blades clean the windscreen by sweeping back and forth in outward and inward directions so that the windscreen is cleaned. A typical sweep refers to the movement of a wiper blade in outward-inward-outward or inward-outward-inward direction based on the park position. Usually, a WWS of an aircraft is designed to operate at fixed speeds (sweeps per minute) that can be identified as low, intermittent and high speeds and the pilot and co-pilot are able to operate it independently and synchronously. When the pilot and co-pilot operate wipers at the same time, both (pilot and co-pilot) side wipers can be synchronized to avoid distractions. In some cases, a wash system can be included in a WWS as well. The wash system sprays washer fluid onto the windscreen to facilitate cleaning and is normally a common system for both the pilot and the co-pilot.

Since, in current WWSs, wiper arms and wiper blades are only selectable to operate at fixed speeds and only in one of the wiper modes, in cases of special or particularly acute situations, such as heavy dirt, bird remains, heavy ice on glass, etc., the wiper blades and the wiper arms may not be able to clean the windscreen properly or might get stuck in the middle of the windscreen due to an inability of the system to clean the debris completely. Currently, such scenarios are handled by crew members through manual switching of the WWS wiper to "off" as there are no robust mechanisms to keep critical areas of the windscreen clean so that the outside view is not obscured for the crew members.

BRIEF DESCRIPTION

According to an aspect of the disclosure, a windscreen wiper system (WWS) architecture is provided. The WWS architecture includes a wiper assembly and an electronic control unit (ECU) configured to control operations of the wiper assembly. The ECU is configured to recognize that a command to engage a predefined wiper mode is received. The predefined wiper mode is characterized in that a windscreen is divided into sectors and the wiper assembly is controllably operated to sweep across one or more of the sectors in a predefined pattern with a predefined sweep speed. The ECU is further configured to control the wiper assembly to operate in the predefined wiper mode according to the command being received.

In accordance with additional or alternative embodiments, the WWS architecture further includes a cockpit input/output (I/O) unit configured to be receptive of the command, an avionics bus by which the cockpit I/O unit is coupled to the WWS and one or more of a wash system, a parallel WWS and avionics systems coupled to the WWS and the cockpit I/O unit via the avionics bus.

In accordance with additional or alternative embodiments, the cockpit I/O unit includes a pilot/co-pilot interface and the pilot/co-pilot interface includes one or more of a voice command interface, a tactile command interface and a touchscreen.

In accordance with additional or alternative embodiments, the WWS architecture further includes a sensor system to sense a condition of the windscreen, which is coupled to the cockpit I/O unit, and the command is automatically generated by the sensor system according to a sensing result and the sensor system includes at least one of an optic sensor, a torque sensor, a temperature sensor and a current sensor.

In accordance with additional or alternative embodiments, the predefined wiper mode includes a windscreen deep clean mode.

In accordance with additional or alternative embodiments, the predefined wiper mode is one or more of re-configurable in real-time and re-configurable based on pilot/co-pilot identification information.

In accordance with additional or alternative embodiments, a critical area of the windscreen is divided into the sectors and the sectors are of equal or unequal angles.

In accordance with additional or alternative embodiments, the predefined pattern and the predefined sweep speed are predefined for each of the sectors.

In accordance with additional or alternative embodiments, activation of the predefined pattern and the predefined sweep speed is selectable for each of the sectors.

According to an aspect of the disclosure, a windscreen wiper system (WWS) architecture is provided. The WWS architecture includes a WWS including a wiper assembly and an electronic control unit (ECU) configured to control operations of the wiper assembly and a cockpit input/output (I/O) unit coupled to the ECU and configured to be receptive of a command to engage a predefined wiper mode. The predefined wiper mode is characterized in that a windscreen is divided into sectors and the wiper assembly is controllably operated to sweep across one or more of the sectors in a predefined pattern with a predefined sweep speed. The ECU is configured to recognize that the command is received by the cockpit I/O unit and to control the wiper assembly to operate in the predefined wiper mode accordingly.

In accordance with additional or alternative embodiments, the WWS architecture further includes an avionics bus by which the cockpit I/O unit is coupled to the WWS and one or more of a wash system, a parallel WWS and avionics systems coupled to the WWS and the cockpit I/O unit via the avionics bus.

In accordance with additional or alternative embodiments, the cockpit I/O unit includes a pilot/co-pilot interface and the pilot/co-pilot interface includes one or more of a voice command interface, a tactile command interface and a touchscreen.

In accordance with additional or alternative embodiments, the WWS architecture further includes a sensor system to sense a condition of the windscreen, which is coupled to the cockpit I/O unit, and the command is automatically generated by the sensor system according to a sensing result and the sensor system includes at least one of an optic sensor, a torque sensor, a temperature sensor and a current sensor.

In accordance with additional or alternative embodiments, the predefined wiper mode includes a windscreen deep clean mode.

In accordance with additional or alternative embodiments, the predefined wiper mode is one or more of re-configurable in real-time and re-configurable based on pilot/co-pilot identification information.

In accordance with additional or alternative embodiments, a critical area of the windscreen is divided into the sectors and the sectors are of equal or unequal angles.

In accordance with additional or alternative embodiments, the predefined pattern and the predefined sweep speed are predefined for each of the sectors.

In accordance with additional or alternative embodiments, activation of the predefined pattern and the predefined sweep speed is selectable for each of the sectors.

According to an aspect of the disclosure, a method of operating a windscreen wiper system (WWS) architecture is provided. The method includes recognizing that a command to engage a predefined wiper mode is received, reading current configuration information of the predefined wiper mode upon recognizing that the command is received, the current configuration information including a division of a windscreen into sectors and instructions to controllably operate a wiper assembly to sweep across one or more of the sectors in a predefined pattern with a predefined sweep speed, and controllably operating the wiper assembly to sweep across one or more of the sectors in the predefined pattern with the predefined sweep speed.

In accordance with additional or alternative embodiments, the method further includes deactivating the predefined wiper mode upon receipt of a command to engage alternative wiper modes.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a WWS is provided and includes a programmatically controlled pattern-based sweep mechanism. A windscreen is divided into multiple small regions (or sectors), the sectors are defined and a pattern or sequence based on the defined sectors is programmed to clean the windscreen. The WWS also includes systems and methods for manually activating and deactivating a wiper mode characterized as being associated with the programmed pattern or sequence (i.e., a deep clean mode or another similar type of mode) from the cockpit or by way of interconnected avionics systems.

Figure 1:
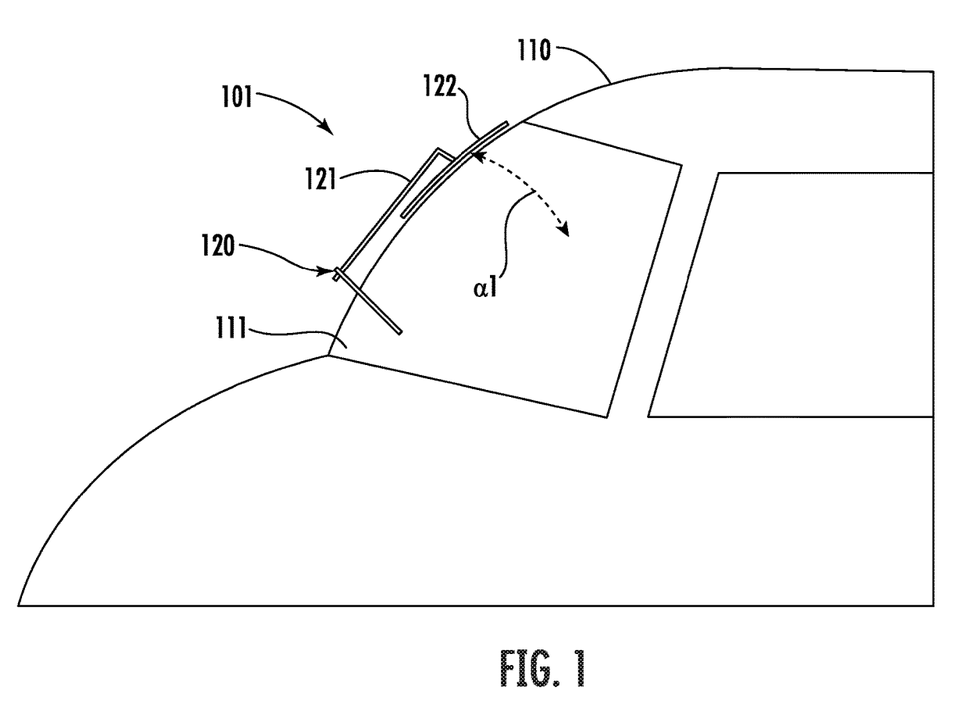
FIG. 1 is a schematic illustration of external components of a WWS in accordance with embodiments.

With reference to FIG. 1, a typical WWS 101 is provided for use with an airframe 110, such as an airframe of a vehicle or an aircraft. The airframe 110 is supportive of a windscreen 111. The WWS 101 includes a wiper blade assembly 120 and an internal control assembly to be described in greater detail below. The wiper blade assembly 120 includes a wiper arm 121 and a wiper blade 122. The wiper blade 122 is attached to a distal end of the wiper arm 121 and is biased toward and onto the windscreen 111 by the wiper arm 121. The wiper blade assembly 120 is configured to assume a parked position relative to the windscreen 111 unless a pilot/copilot command (or an automatically generated command) is entered to initiate a driving of the wiper blade assembly 120 whereby the wiper blade 122 moves across the windscreen 111 along a sweep angle α1 in forward and reverse directions (i.e., inward-outward-inward or outward-inward-outward) from the parked position. The internal control assembly is configured to drive the wiper blade assembly 120 across the windscreen 111 along the sweep angle α1 such that the wiper blade element moves across the windscreen 111 to remove moisture or foreign object debris from the windscreen 111.

Figure 2:
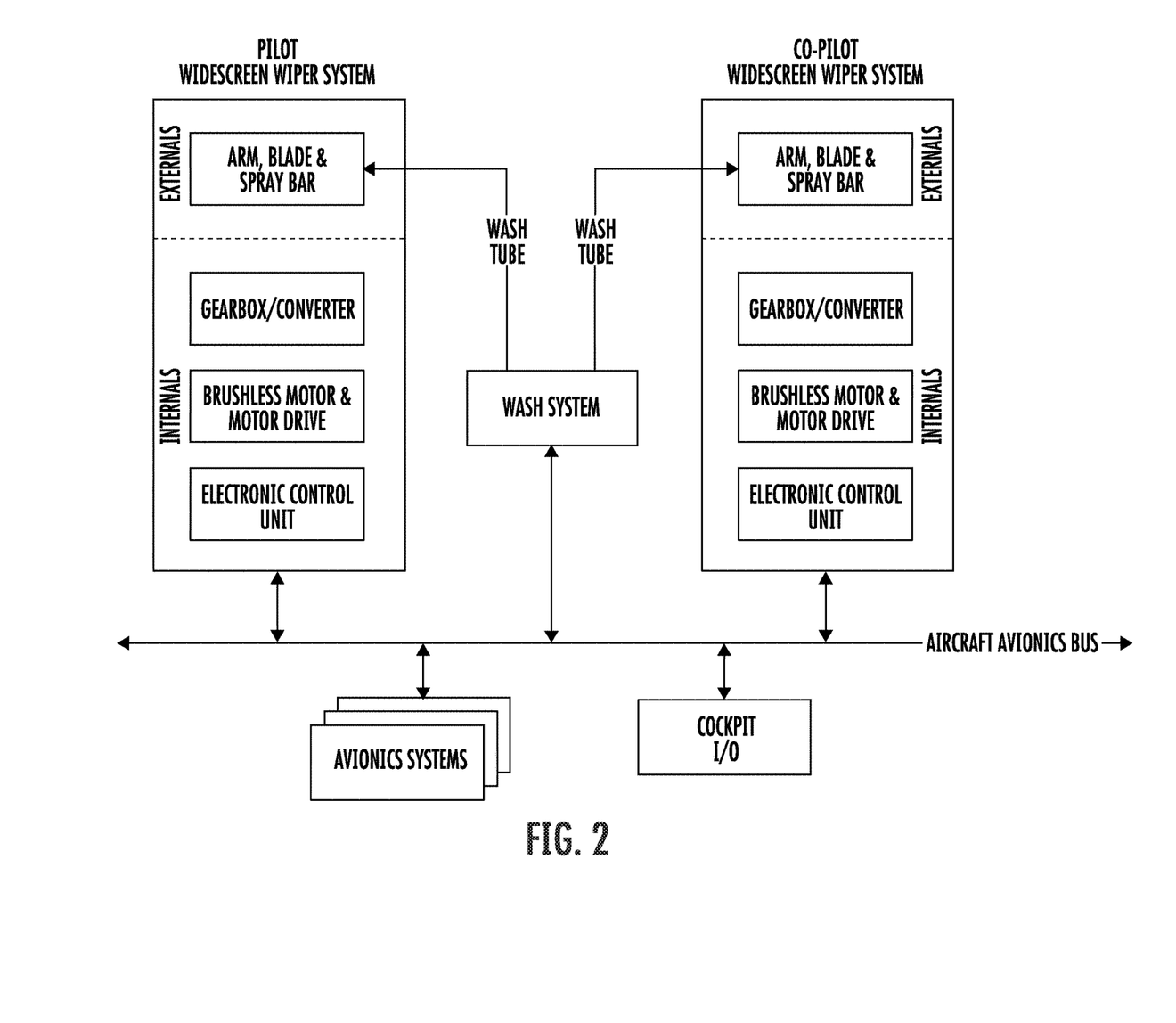
FIG. 2 is a schematic diagram of components of a WWS in accordance with embodiments.
Figure 3:
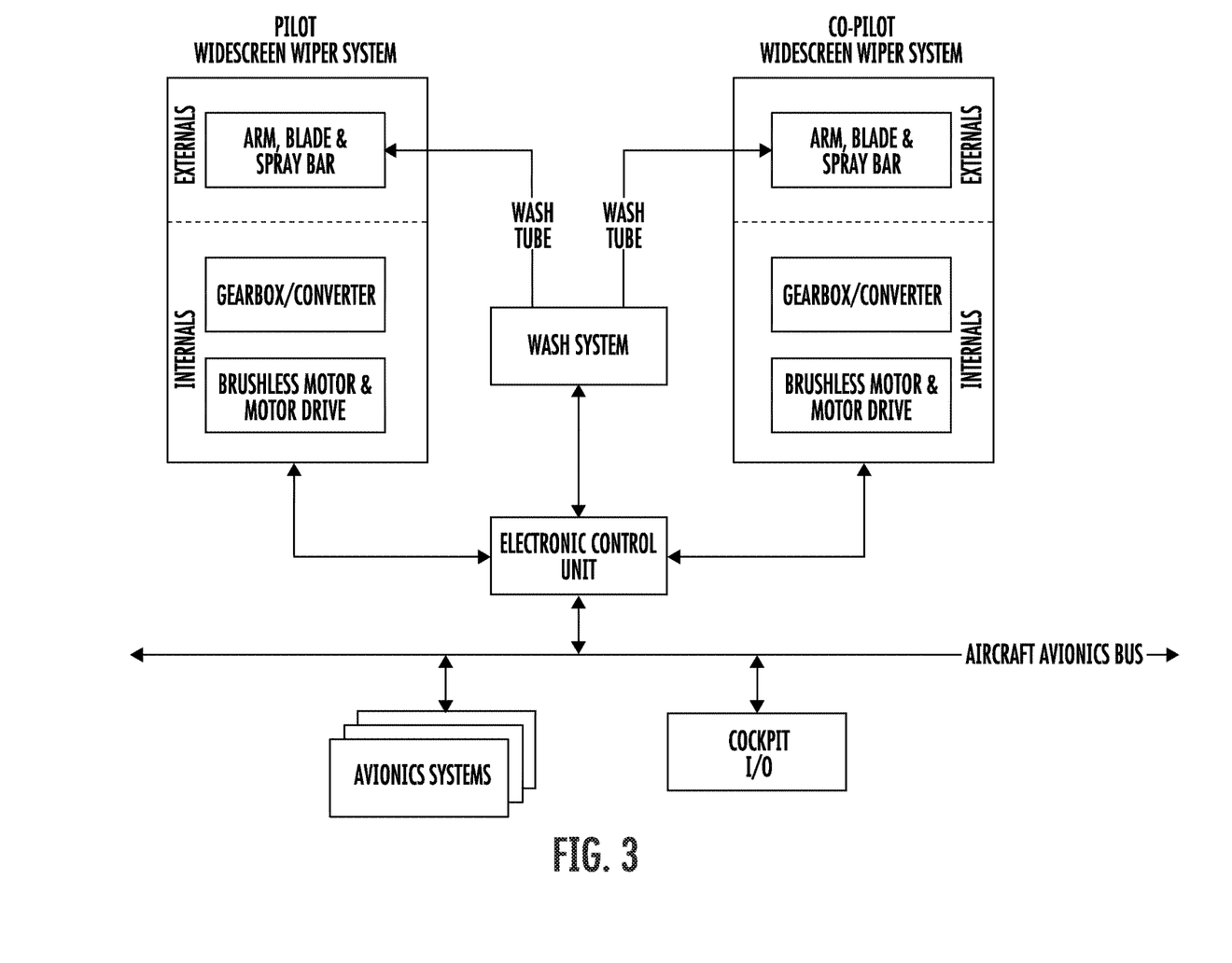
FIG. 3 is a schematic diagram of components of a WWS in accordance with embodiments.

The typical WWS of FIG. 1 includes an electronic control unit (ECU), a motor drive, a brushless motor, a gearbox/converter, a wiper arm, a wiper blade and a spray bar. High-level architectures of these components are illustrated in FIGS. 2 and 3 (in FIG. 2, separate ECUs are implemented on both pilot and co-pilot wiper systems and, in FIG. 3, a common ECU is shared between pilot and co-pilot wiper systems). In each case, as shown in FIGS. 2 and 3, various avionics systems in an aircraft communicate via a secured aircraft avionics bus. The aircraft avionics bus could be a wired communication interface or a wireless communication interface. The pilot and co-pilot side WWSs are connected to the aircraft avionics bus whereby data (e.g., wiper synchronization data, wash control data, wash fluid level status data, etc.) and inputs (e.g., wiper mode selection inputs, wiping speed inputs, wash control inputs, etc.) are communicated between WWSs and other connected systems. In the embodiments of FIG. 1, pilot and co-pilot WWSs have similar hardware and substantially identical software with wiper blade position/location identified through hardware pin-programming. In the embodiments of FIG. 2, a dedicated communication bus for intercommunication between pilot and co-pilot WWSs is implemented as a wired or wireless communication interface.

Figure 4:
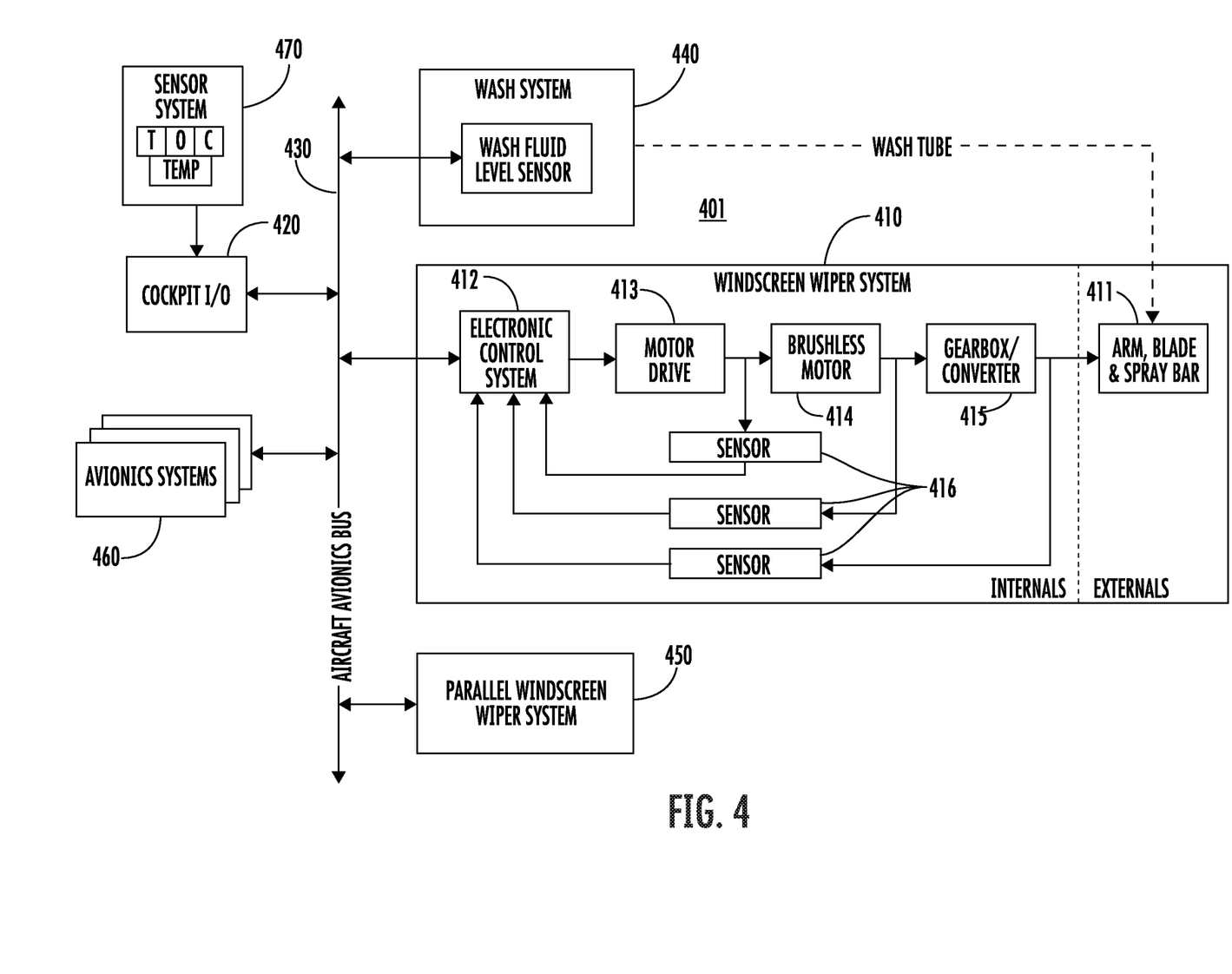
FIG. 4 is a schematic illustration of a WWS architecture in accordance with embodiments.

With reference to FIG. 4, a windscreen wiper system (WWS) architecture 401 is provided and includes a WWS 410, which can be similar to the WWS 101 of FIG. 1 except as described herein, and a cockpit input/output (I/O) unit 420. The WWS 410 includes a wiper assembly 411, which in turn includes wiper arms, wiper blades and one or more spray bars, an electronic control unit (ECU) 412, a motor drive 413, a brushless motor 414, a gearbox/converter 415 and first, second and third sensors 416. The ECU 412 is configured to control operations of the wiper assembly 411 by way of the motor drive 413, the brushless motor 414 and the gearbox/converter 415 in accordance with readings of the first, second and third sensors 416. The cockpit I/O unit 420 is coupled to the ECU 412 and is configured to be receptive of a command to engage a predefined wiper mode. The predefined wiper mode is characterized in that a windscreen, such as the windscreen 111 of FIG. 1, is divided into sectors as will be described in greater detail below and is further characterized in that the wiper assembly 411 is controllably operated by the ECU 412 to sweep across one or more of the sectors in a predefined pattern with a predefined sweep speed. The ECU 412 is configured to recognize that the command is received by the cockpit I/O unit 420 and to control the wiper assembly 411 to operate in the predefined wiper mode accordingly.

As shown in FIG. 4, the WWS architecture 401 further includes an avionics bus 430 by which the cockpit I/O unit 420 is coupled to the WWS 410 and one or more of a wash system 440 that is configured to spray washer fluid on the windscreen, a parallel WWS 450 (the WWS 410 and the parallel WWS 450 can be configured similarly as shown in FIG. 2 or FIG. 3) and avionics systems 460. The one more of the wash system 440, the parallel WWS 450 and the avionics systems 460 can be coupled to the WWS 410 and the cockpit I/O unit 420 via the avionics bus 430.

Figure 5:
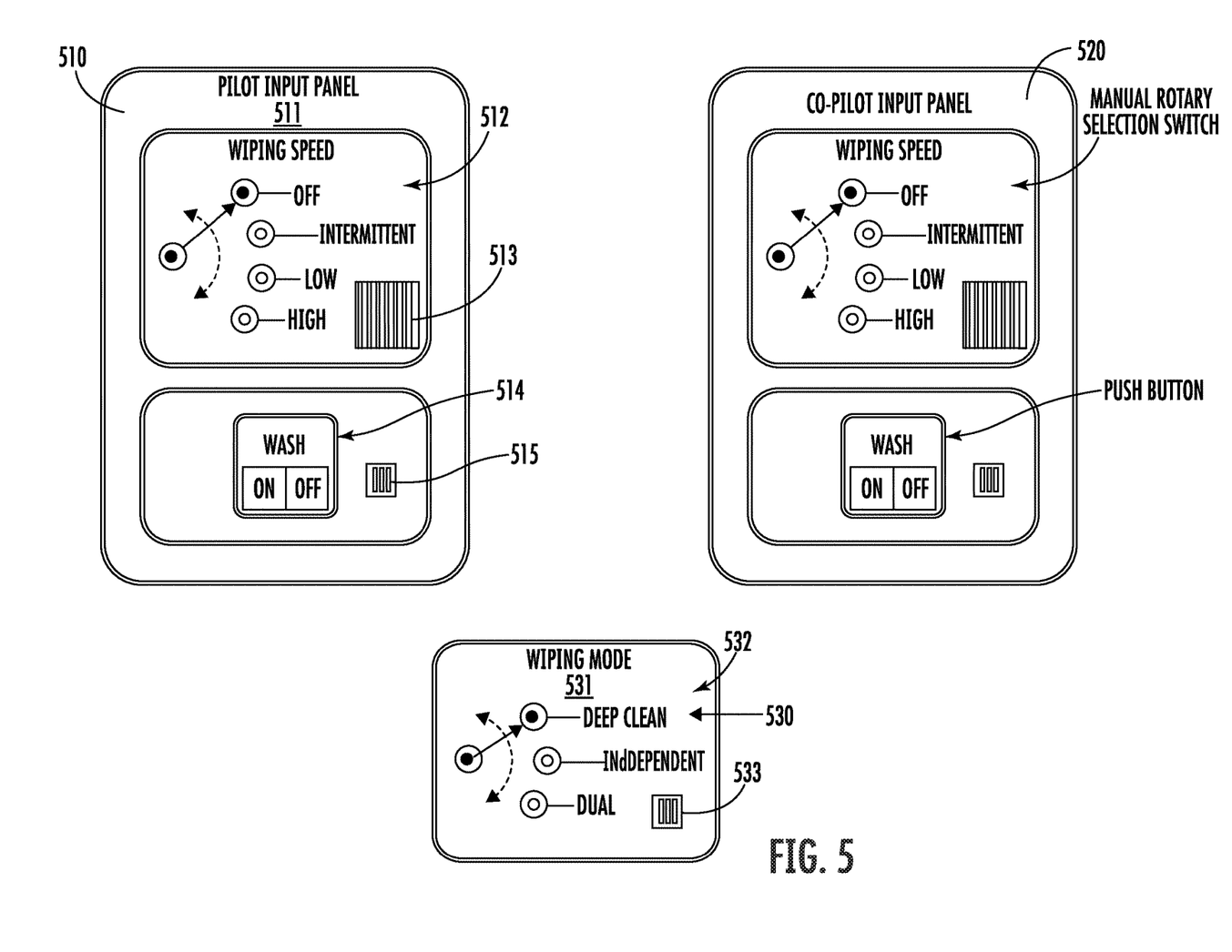
FIG. 5 is a diagram of pilot and co-pilot interface panels in accordance with embodiments.
Figure 6:
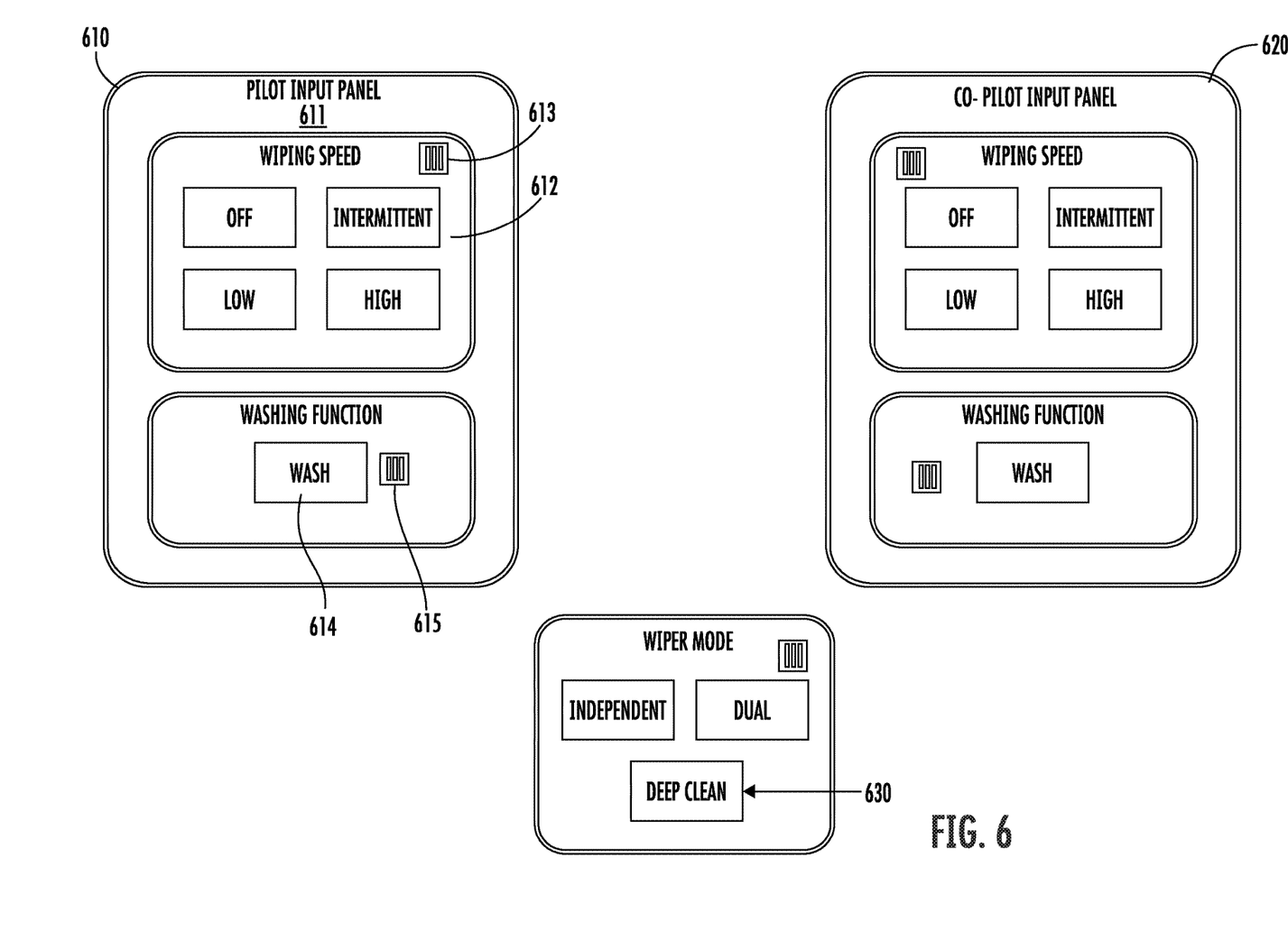
FIG. 6 is a diagram of pilot and co-pilot interface panels in accordance with embodiments.

With reference to FIGS. 5 and 6, the cockpit I/O unit 420 of the WWS architecture 401 of FIG. 4 can include an analog pilot interface 510 (see FIG. 5) or a pilot graphical user interface (GUI) 610 (see FIG. 6), an analog co-pilot interface 520 (see FIG. 5) or a co-pilot GUI 620 (see FIG. 6) and a common analog wiper mode interface 530 (see FIG. 5) or a common GUI 630 (see FIG. 6). The analog pilot interface 510 can be provided as a pilot input panel 511 and can include a wiping speed portion with a manual rotary selection switch 512 or a first microphone element 513 and a wash portion with a manual push button 514 or a second microphone element 515. The pilot GUI interface 610 can be provided as a pilot input panel 611 and can include a wiping speed portion with a GUI button 612 or a first microphone element 613 and a wash portion with a GUI button 614 or a second microphone element 615. The analog co-pilot interface 520 and the co-pilot GUI 620 can be configured similarly. The common analog wiper mode interface 530 can be provided as a common panel 531 and can include a manual rotary selection switch 532 that allows for a selection of the predefined wiper mode or independent or dual operational modes or a third microphone element 533. The common GUI 630 can be configured similarly. Thus, as shown in FIGS. 5 and 6, the cockpit I/O unit 420 can be provided as one or more of a voice command interface (i.e., by way of the microphone elements) and a tactile command interface (i.e., by way of the analog and GUI switches and buttons).

Figure 7:
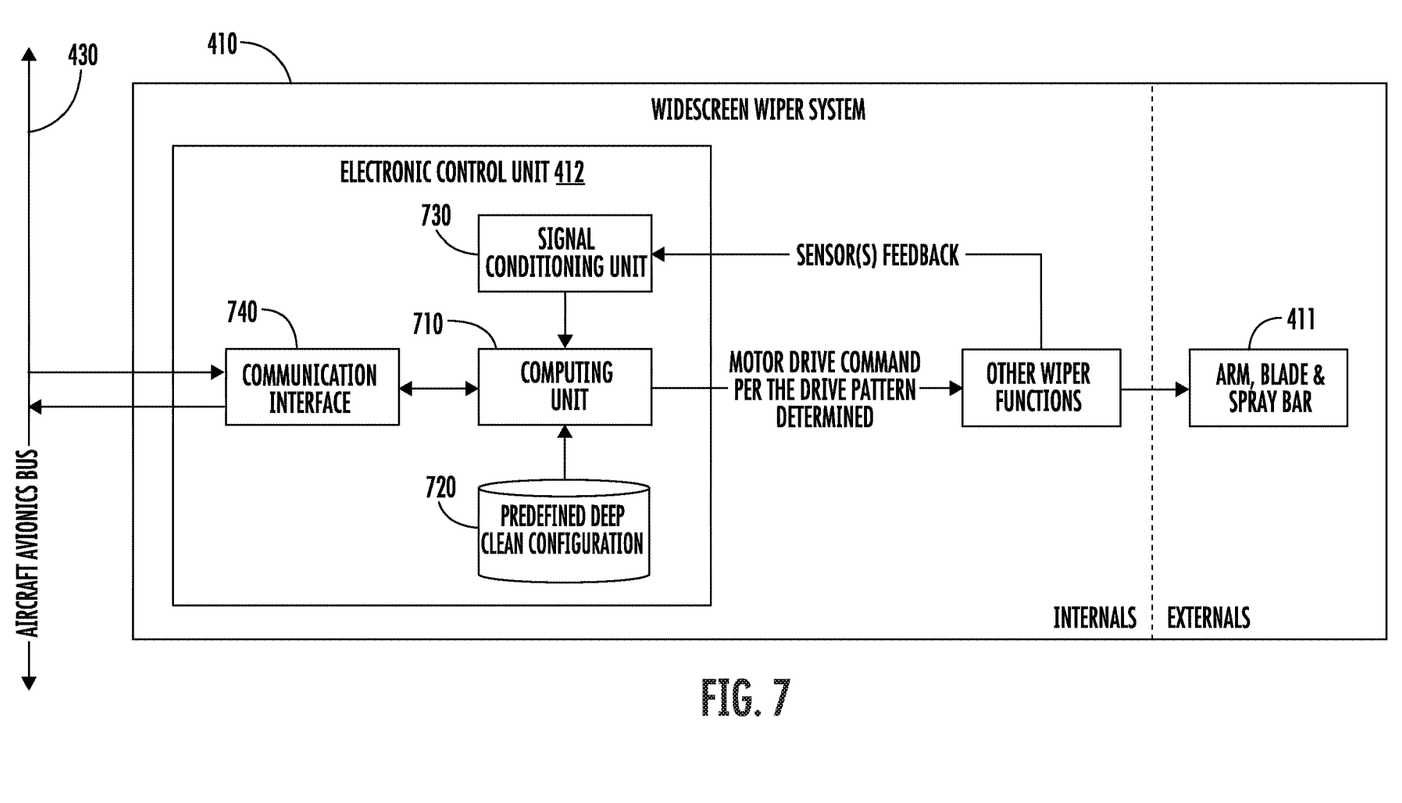
FIG. 7 is a schematic illustration of components of the WWS architecture of FIG. 4 in accordance with embodiments.

With reference to FIG. 7, the ECU 412 of the WWS 410 of FIG. 4 can include or be provided as a micro-controller or central processing unit and can include a computing unit 710, a database 720 to store the information of the predefined wiper mode, a signal conditioning unit 730 and a communication interface 740, which is disposed in signal communication with the avionics bus 430. The computing unit 710 is configured to issue motor drive commands per a determined drive pattern (i.e., the predefined wiper mode) being engaged to the wiper assembly 411 along with other wiper function commands based on feedback data received by the computing unit 710 from the signal conditioning unit 730. The signal conditioning unit 730 is configured to receive sensor feedback by which the feedback data is generated.

With reference back to FIG. 4, the WWS architecture 401 can further include a sensor system 470. The sensor system 470 can be configured to sense a condition of the windscreen (i.e., the windscreen 111 of FIG. 1) and is coupled to the cockpit I/O unit 420. Here, the sensor system 470 can be configured to automatically generate the command to engage the predefined wiper mode according to a result of the sensing of the condition of the windscreen. That is, in an event that a pilot or co-pilot's view through the windscreen is found to be blocked by the sensor system 470, the sensor system 470 can automatically generate the command even if the pilot or the co-pilot do not input the command themselves. In accordance with embodiments, the sensor system 470 can include at least one of an optic sensor O, a torque sensor T, a temperature sensor TEMP and a current sensor C to sense the condition of the windscreen.

Figure 8:
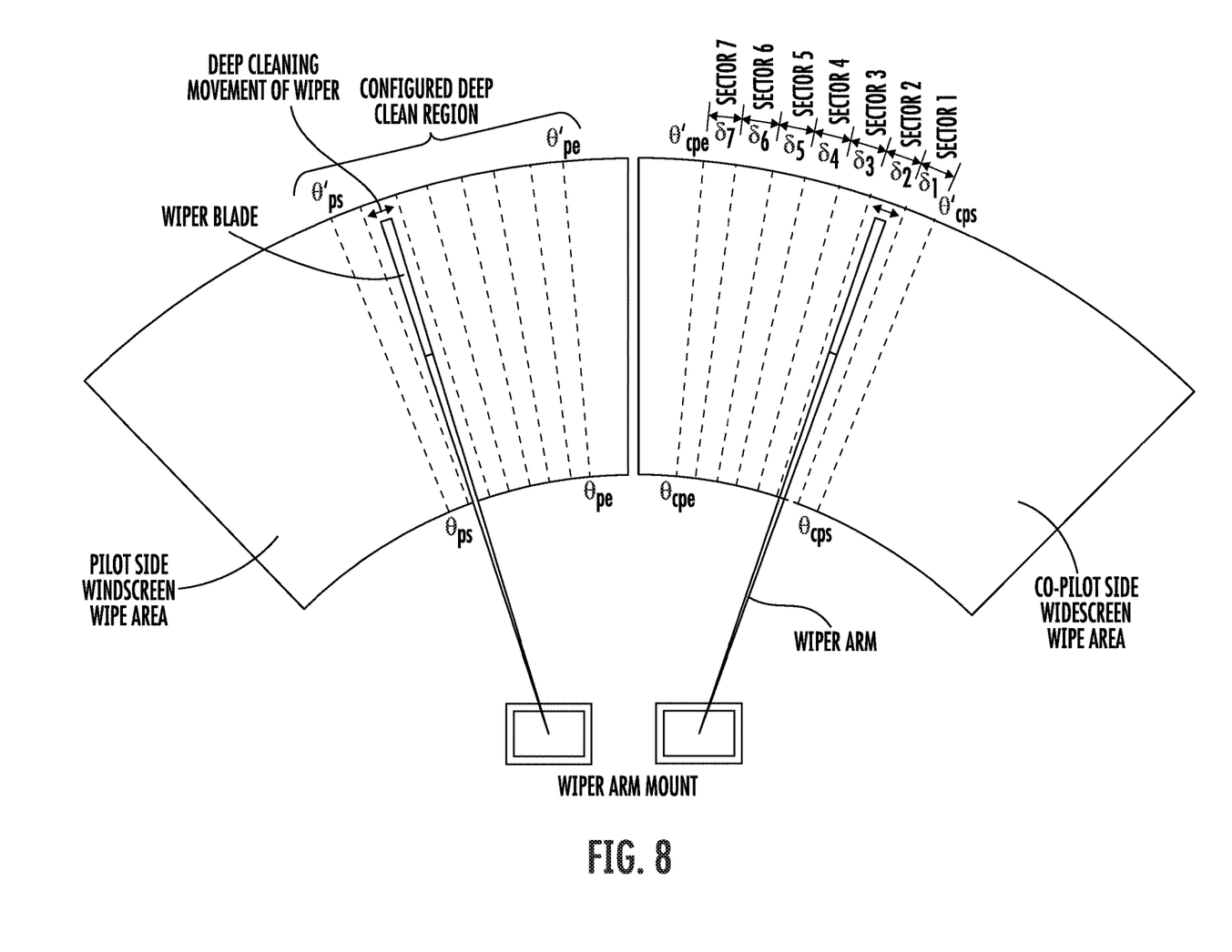
FIG. 8 is an illustration of a division of a windscreen into sectors in accordance with embodiments.

With reference to FIG. 8, the predefined wiper mode can include, but is not limited to, a deep clean mode for a windscreen. Also, it is the critical area of the windscreen that is divided into the sectors (see, e.g., sectors 1-7 of FIG. 8) for the predefined wiper mode and the sectors can be defined as angular sectors of the windscreen (i.e., the critical area of the windscreen) that can be sized equally or uniformly or that can be sized unequally. As used herein, the critical area of the windscreen refers to the area of the windscreen that a pilot/co-pilot predominantly looks through during most flight operations. In addition, the predefined pattern and the predefined sweep speed can be predefined similarly or different for each of the sectors. That is, the predefined wiper mode can be configured such that the wiper assembly 411 passes quickly over sectors 1, 2, 6 and 7 but oscillates more quickly over sectors 3, 4 and 5.

In accordance with embodiments, a method of dividing the critical area of a windscreen into multiple sectors can be defined by equation 1 as follows (again, the sectors can be but need not be of equal angles).

Equation 1: Dividing Critical Area into Multiple Sectors $$\theta_s - \theta_e = \theta'_s - \theta'_e = \sum_{k=1}^{n} \delta_k$$

where, $\theta s = \theta'_s$ = Start angle of the critical area
$\theta_e = \theta'_e$ = End angle of the critical area
$\delta$ = Sector angle
n = Number of sectors In FIG. 8, the critical areas in pilot and co-pilot windscreens are represented by the regions $\theta_{ps} \theta_{pe} \theta'_{pe} \theta'_{ps}$ and $\theta_{cps} \theta_{cpe} \theta'_{cpe} \theta'_{cps}$ respectively. The critical area of co-pilot windscreen $\theta_{cps} \theta_{cpe} \theta'_{cpe} \theta'_{cps}$ is divided into multiple sectors (sector 1 through sector 7) represented by $\delta_1, \delta_2, \delta_3, \delta_4, \delta_5, \delta_6, \delta_7$ respectively such that, $\theta_{cps} - \theta_{cpe} = \delta_1 + \delta_2 + \delta_3 + \delta_4 + \delta_5 + \delta_6 + \delta_7$ The sector details are derived from the specification of the platform in which the wiper systems are installed and the details are at least initially programmed/stored in persistent memory of the database 720 at the factory.

As an example, the following table 1 illustrates the contents of a predefined wiper mode configuration in accordance with embodiments.

| Pattern → Sector Definition → Limits → | Sector ID ID <#> | Sector ID Start angle <#> | ... End angle <#> | Sector ID Wipe cycles <#> | Wipe speed Low intermittent High <#> | Wash control On Off |
|---|---|---|---|---|---|---|

The predefined wiper mode configuration of table 1 includes definitions of sectors and the predefined pattern (sequence of execution of sectors) to clean the windscreen.

As shown in table 1, the "Pattern" row includes a series of sector identifiers which defines the order of cleaning of sectors in the critical area. For example, if the critical area is divided into 5 sectors (identified by sector identifiers: #1, #2, #3, #4 and #5), the pattern of #5, #2, #4, #1, #3 defines that the sector #5 is cleaned first followed by sector #2, sector #4, sector #1 and sector #3. The "Sector definition" row includes wiper system parameters for each of the sectors. The sector definition includes, but is not limited to, sector identifier, start angle (in degree or absolute position in the windscreen), end angle (in degree or absolute position in the windscreen), number of wipe cycles, wipe speed (LOW or INTERMITTENT or HIGH or any arbitrary wiper speed represented in wipes per second), and wash control (ON or OFF).

As another example, the following table 2 illustrates an example of a predefined wiper mode configuration in which a critical section from 45° to 65° in the windscreen is split into three sectors of varying angle sizes.

| Pattern → | | #3 | #1 | #2 | | |
|---|---|---|---|---|---|---|
| | ID | Start angle | End angle | Wipe cycles | Wipe speed | Wash control |
| Sector Definitions → | #1 | 45 | 50 | 10 | LOW | ON |
| | #2 | 50 | 60 | 15 | HIGH | ON |
| | #3 | 60 | 65 | 10 | 120 | ON |

In any case, with reference back to FIG. 7, the information of the predefined wiper mode can be one or more of re-configurable in real-time and re-configurable based on pilot/co-pilot identification information. In the former case, especially where the WWS architecture 401 includes the sensor system 470, the computing unit 710 can be configured to modify or adjust an aspect of the predefined wiper mode to account for changes in the condition of the windscreen. For example, while a predefined wiper mode might provide for a deep cleaning operation of each of the sectors of the windscreen equally, the computing unit 710 can adjust the divisions of the windscreen into alternative sectors and the predefined pattern to concentrate the deep cleaning on a particular location. In the latter case, it is to be understood that different pilots/co-pilots with different body types have different critical areas of windscreens. Here, the pilot/co-pilot information can associate pilot/co-pilot identification information with their body type information so that a critical area of the windscreen for each individual pilot/co-pilot can be uniquely addressed by the predefined wiper mode. In such cases, the predefined wiper mode modifications and adjustments can be made prior to take-off when each pilot/co-pilot assumes their respective commands.

Figure 9:
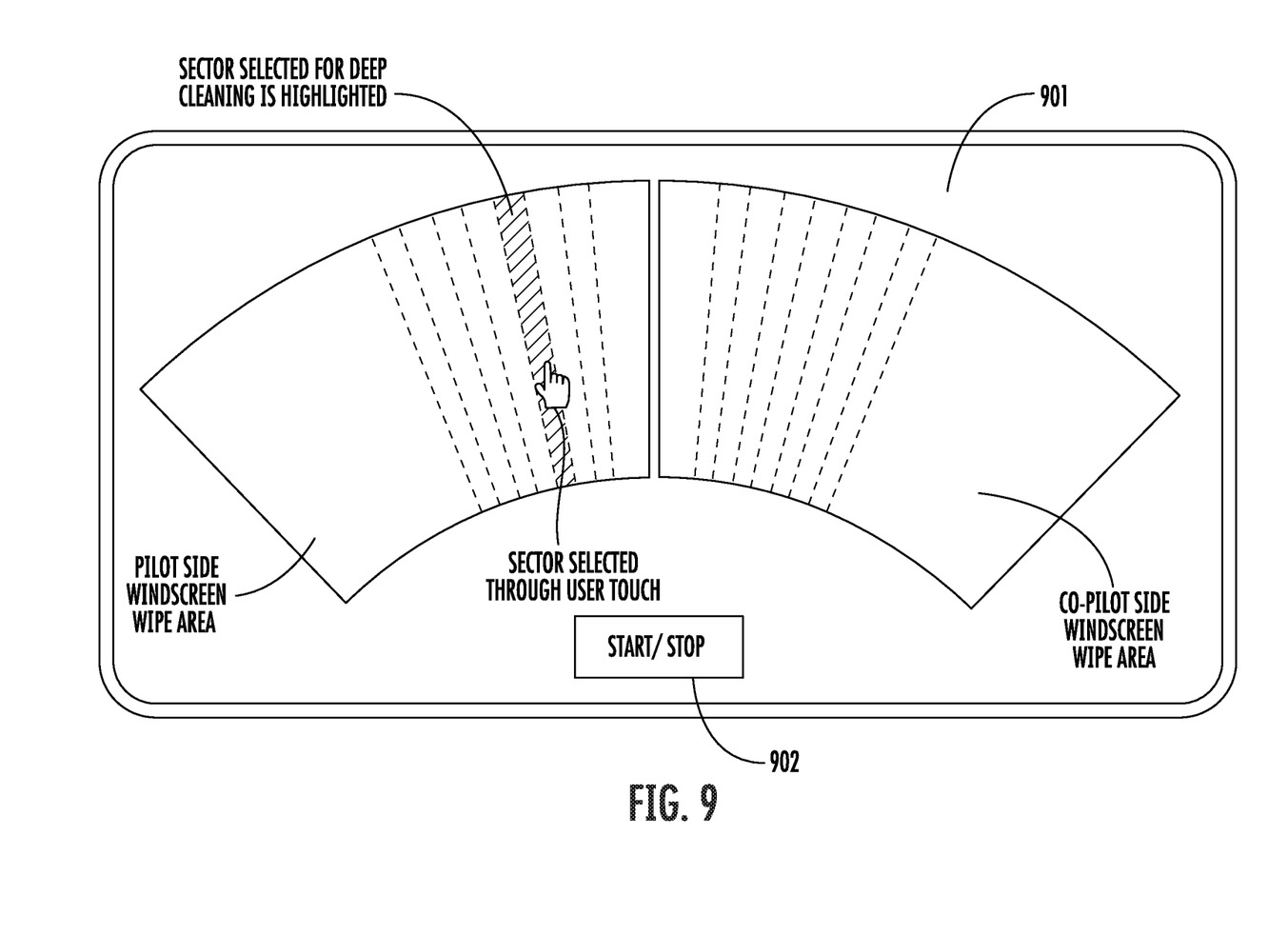
FIG. 9 is a diagram of pilot and co-pilot interface panels in accordance with embodiments.

With reference to FIG. 9 and, in accordance with further embodiments, the WWS architecture 401 can provide for a capability for the pilot/co-pilot to manually select a particular sector for cleaning through a touch-enabled input panel/device 901 in the cockpit. This selective manual activation of the predefined wiper mode or a portion thereof (i.e., selective manual activation of deep cleaning capability) can be used in addition to automatic sensing by the sensor system 470. In accordance with alternative embodiments, the touch-enabled input panel/device 901 (or the other interfaces and GUIs described herein) could be provided as an application that is executable on a portable electronic device (PED), a smartphone, a tablet, a multi-function display, etc. In any case, the touch-enabled input panel/device 901 can be provided as a "touch display" or "touch-screen."

Where the touch-enabled input panel/device 901 is provided, the sectors belonging to pilot and co-pilot portions of the windscreen are displayed to the pilot/co-pilot whereupon the pilot/co-pilot selects the sector that needs to be cleaned by touching the corresponding sector in the touch-enabled input panel/display 901. Once the selection is made, the pilot/co-pilot selects a "start" push button 902 so that the predefined wiper mode or deep clean for the selected sector is initiated. The push button 902 toggles to "stop," which provides a mechanism for the pilot/co-pilot to stop the current ongoing selective manual deep clean operation.

The touch-enabled input panel/display 901 could be installed separately (as two touch displays) for the pilot and the co-pilot or can be a common touch display for the pilot and the co-pilot to operate. That is, the start/stop push button and any other feature(s) of the touch-enabled input panel/display can be provided as dedicated and/or independent features for both the pilot and the copilot. Thus, as with the other embodiments discussed herein, the pilot and the copilot can each operate the predefined wiper mode or deep clean independently for their respective windscreens or in concert.

Figure 10:
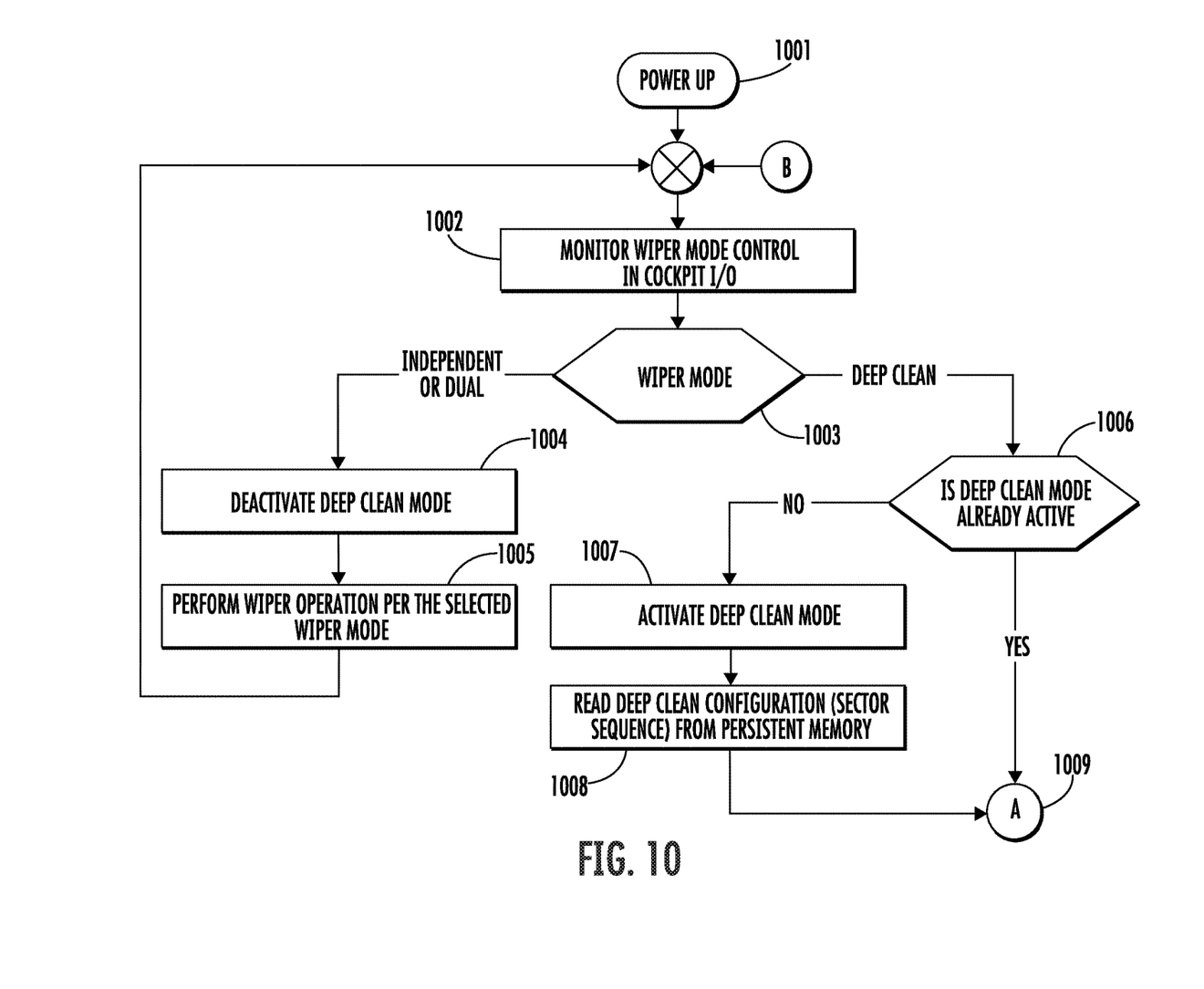
FIG. 10 is a flow diagram illustrating a method of operating a WWS architecture in accordance with embodiments.
Figure 11:
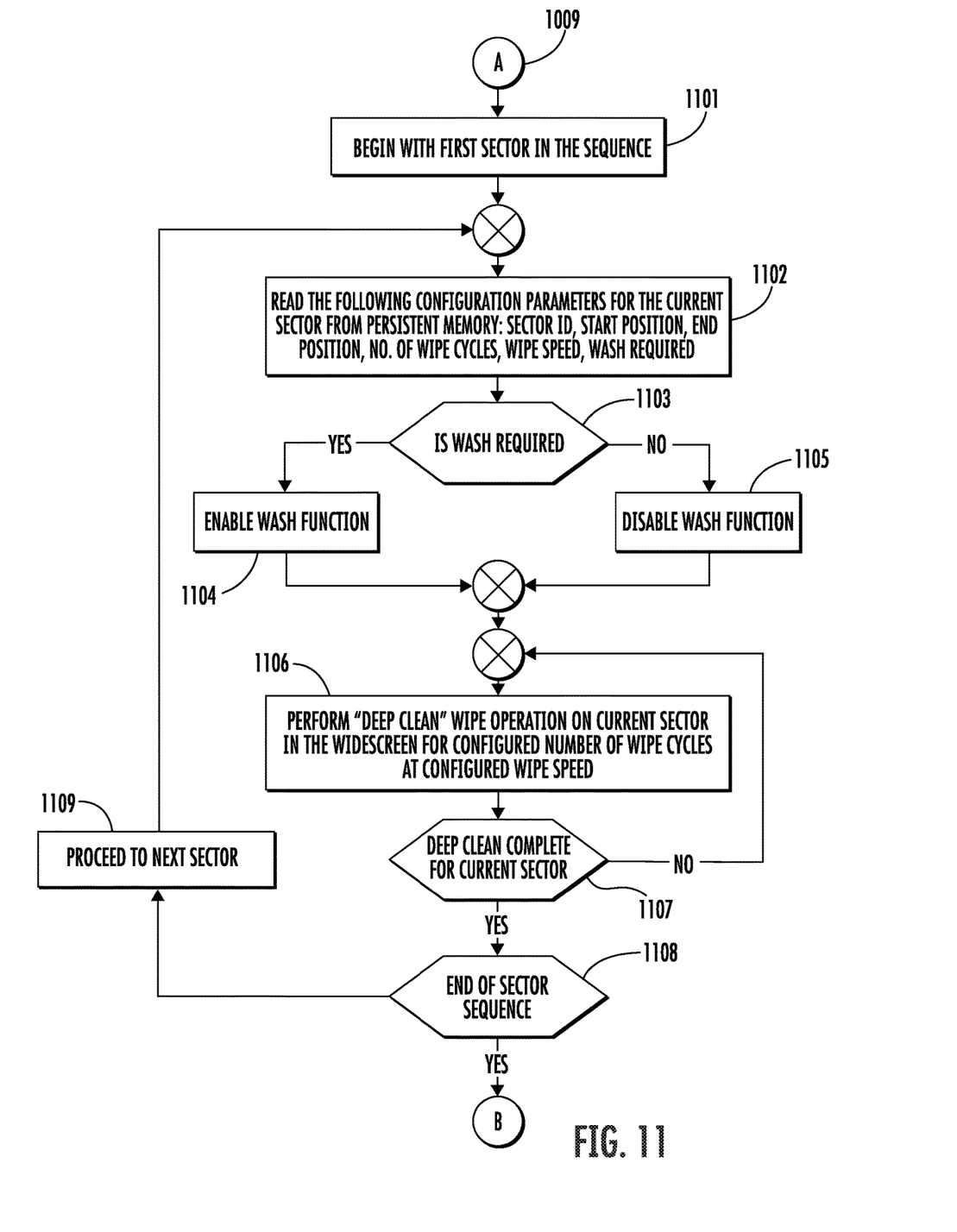
FIG. 11 is a flow diagram illustrating a method of executing a predefined wiper mode in accordance with embodiments.

With reference to FIGS. 10 and 11, a method of operating WWS architecture 401 is provided. The method includes a power-up operation 1001, a subsequent monitoring of a wiper mode command 1002 and recognizing that a command to engage independent or dual (i.e., alternative) wiper modes or a predefined wiper mode is received 1003. At this point, in an event the independent or dual wiper mode commands are received, the predefined wiper mode is deactivated 1004 and the independent or dual wiper mode operations are performed 1005. Control then reverts back to the monitoring of the wiper mode command 1002. In an event the command to engage the predefined wiper mode is received, a determination as to whether the predefined wiper mode is already engaged is made 1006. If so, control proceeds to A. if not, the predefined wiper mode is activated 1007, current configuration information of the predefined wiper mode is read 1008 and control proceeds to A. As noted above, the current configuration information can include a division of a windscreen into sectors and instructions to controllably operate a wiper assembly to sweep across one or more of the sectors in a predefined pattern with a predefined sweep speed.

As shown in FIG. 11, with control proceeding to A, the method includes controllably operating the wiper assembly to sweep across one or more of the sectors in the predefined pattern with the predefined sweep speed 1009. In accordance with embodiments, this can, but is not required to, include beginning with a first sector in the sequence 1101, subsequently reading configuration parameters for the current sector 1102 and determining if a wash is required 1103. If a wash is required, a wash function is enabled 1104 and, if not, the wash function is disabled 1105. Operation in the predefined wiper mode is then performed 1106 until completion 1107 for the current sector whereupon it is determined whether the sequence is complete 1108. If so, control reverts to B in FIG. 10. If not, the sequence proceeds to the next sector 1109.

Technical effects and benefits of the enclosure design of the present disclosure are the provision of an enhanced ability to clear a most critical area of an aircraft windscreen, an enhanced ability to more thoroughly clean debris from the aircraft windscreen and an improved operator experience to allow tailoring of a cleaning profile.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A windscreen wiper system (WWS) architecture, comprising:
    a WWS comprising a wiper assembly and an electronic control unit (ECU) configured to control operations of the wiper assembly,
    wherein:
        the ECU is configured to recognize that a command to engage a predefined wiper mode is received,
        the predefined wiper mode is characterized in that:
            a pilot side of a windscreen and a co-pilot side of the windscreen are each divided into sectors,
            a wiper arm and blade of the wiper assembly for the pilot side of the windscreen is controllably operated to sweep across the sectors of the pilot side of the windscreen in a predefined pattern that is predefined for each of the sectors and with a predefined sweep speed that is predefined for each of the sectors, and
            a wiper arm and blade of the wiper assembly for the co-pilot side of the windscreen is controllably operated to sweep across the sectors of the co-pilot side of the windscreen in a predefined pattern that is predefined for each of the sectors and with a predefined sweep speed that is predefined for each of the sectors, and
        the ECU is further configured to control the wiper assembly to operate in the predefined wiper mode according to the command being received,
    wherein, with the predefined pattern predefined for each of the sectors and the predefined sweep speed predefined for each of the sectors:
        the wiper arm and blade of the wiper assembly for the pilot side of the windscreen passes quickly over a portion of the sectors and oscillates quickly over another portion of the sectors in the pilot side of the windscreen,
        the wiper arm and blade of the wiper assembly for the co-pilot side of the windscreen passes quickly over a portion of the sectors and oscillates quickly over another portion of the sectors in the co-pilot side of the windscreen, and
    wherein activation of the predefined pattern predefined for each of the sectors of the pilot side and the co-pilot of the windscreen and the predefined sweep speed predefined for each of the sectors of the pilot side and the co-pilot of the windscreen is selectable for each of the sectors.

2. The WWS architecture according to claim 1, further comprising:
    a cockpit input/output (I/O) unit configured to be receptive of the command;
    an avionics bus by which the cockpit I/O unit is coupled to the WWS; and
    one or more of a wash system, a parallel WWS and avionics systems coupled to the WWS and the cockpit I/O unit via the avionics bus.

3. The WWS architecture according to claim 2, wherein the cockpit I/O unit comprises a pilot/co-pilot interface and the pilot/co-pilot interface comprises one or more of a voice command interface, a tactile command interface and a touchscreen.

4. The WWS architecture according to claim 2, further comprising a sensor system to sense a condition of the windscreen, which is coupled to the cockpit I/O unit, wherein the command is automatically generated by the sensor system according to a sensing result and the sensor system comprises at least one of an optic sensor, a torque sensor, a temperature sensor and a current sensor.

5. The WWS architecture according to claim 1, wherein the predefined wiper mode comprises a windscreen deep clean mode.

6. The WWS architecture according to claim 1, wherein the predefined wiper mode is one or more of re-configurable in real-time and re-configurable based on pilot/co-pilot identification information.

7. The WWS architecture according to claim 1, wherein:
    a critical area of the pilot side of the windscreen is divided into the sectors and the sectors are of equal or unequal angles, and
    a critical area of the co-pilot side of the windscreen is divided into the sectors and the sectors are of equal or unequal angles.

8. The WWS architecture according to claim 1, wherein, with the predefined pattern predefined for each of the sectors and the predefined sweep speed predefined for each of the sectors:
   the wiper arm and blade of the wiper assembly for the pilot side of the windscreen passes over the sectors in the pilot side of the windscreen in a predefined order of cleaning with a predefined number of wipe cycles for each of the sectors,
   the wiper arm and blade of the wiper assembly for the co-pilot side of the windscreen passes over the sectors in the co-pilot side of the windscreen in a predefined order of cleaning with a predefined number of wipe cycles for each of the sectors, and
   wherein activation of the predefined pattern predefined for each of the sectors of the pilot side and the co-pilot of the windscreen and the predefined sweep speed predefined for each of the sectors of the pilot side and the co-pilot of the windscreen is selectable for each of the sectors.

9. A windscreen wiper system (WWS) architecture, comprising:
   a WWS comprising a wiper assembly and an electronic control unit (ECU) configured to control operations of the wiper assembly; and
   a cockpit input/output (I/O) unit coupled to the ECU and configured to be receptive of a command to engage a predefined wiper mode,
   wherein:
      the predefined wiper mode is characterized in that:
      a pilot side of a windscreen and a co-pilot side of the windscreen are each divided into sectors,
      a wiper arm and blade of the wiper assembly for the pilot side of the windscreen is controllably operated to sweep across the sectors of the pilot side of the windscreen in a predefined pattern that is predefined for each of the sectors and with a predefined sweep speed that is predefined for each of the sectors, and
      a wiper arm and blade of the wiper assembly for the co-pilot side of the windscreen is controllably operated to sweep across the sectors of the co-pilot side of the windscreen in a predefined pattern that is predefined for each of the sectors and with a predefined sweep speed that is predefined for each of the sectors and, and
      the ECU is configured to recognize that the command is received by the cockpit I/O unit and to control the wiper assembly to operate in the predefined wiper mode accordingly,
   wherein, with the predefined pattern predefined for each of the sectors and the predefined sweep speed predefined for each of the sectors:
   the wiper arm and blade of the wiper assembly for the pilot side of the windscreen passes over the sectors in the pilot side of the windscreen in a predefined order of cleaning with a predefined number of wipe cycles for each of the sectors, and
   the wiper arm and blade of the wiper assembly for the co-pilot side of the windscreen passes over the sectors in the co-pilot side of the windscreen in a predefined order of cleaning with a predefined number of wipe cycles for each of the sectors,
   wherein activation of the predefined pattern predefined for each of the sectors of the pilot side and the co-pilot of the windscreen and the predefined sweep speed predefined for each of the sectors of the pilot side and the co-pilot side of the windscreen is selectable for each of the sectors.

10. The WWS architecture according to claim 9, further comprising:
   an avionics bus by which the cockpit I/O unit is coupled to the WWS; and
   one or more of a wash system, a parallel WWS and avionics systems coupled to the WWS and the cockpit I/O unit via the avionics bus.

11. The WWS architecture according to claim 9, wherein the cockpit I/O unit comprises a pilot/co-pilot interface and the pilot/co-pilot interface comprises one or more of a voice command interface, a tactile command interface and a touchscreen.

12. The WWS architecture according to claim 9, further comprising a sensor system to sense a condition of the windscreen, which is coupled to the cockpit I/O unit, wherein the command is automatically generated by the sensor system according to a sensing result and the sensor system comprises at least one of an optic sensor, a torque sensor, a temperature sensor and a current sensor.

13. The WWS architecture according to claim 9, wherein the predefined wiper mode comprises a windscreen deep clean mode.

14. The WWS architecture according to claim 9, wherein the predefined wiper mode is one or more of re-configurable in real-time and re-configurable based on pilot/co-pilot identification information.

15. The WWS architecture according to claim 9, wherein:
   a critical area of the pilot side of the windscreen is divided into the sectors and the sectors are of equal or unequal angles, and
   a critical area of the co-pilot side of the windscreen is divided into the sectors and the sectors are of equal or unequal angles.

16. The WWS architecture according to claim 9, wherein, with the predefined pattern predefined for each of the sectors and the predefined sweep speed predefined for each of the sectors:
   the wiper arm and blade of the wiper assembly for the pilot side of the windscreen passes quickly over a portion of the sectors and oscillates quickly over another portion of the sectors in the pilot side of the windscreen,
   the wiper arm and blade of the wiper assembly for the co-pilot side of the windscreen passes quickly over a portion of the sectors and oscillates quickly over another portion of the sectors in the co-pilot side of the windscreen, and
   wherein activation of the predefined pattern predefined for each of the sectors of the pilot side and the co-pilot of the windscreen and the predefined sweep speed predefined for each of the sectors of the pilot side and the co-pilot of the windscreen is selectable for each of the sectors.

\* \* \* \* \*